United States Patent
Kiselev et al.

(10) Patent No.: US 7,096,332 B1
(45) Date of Patent: Aug. 22, 2006

(54) USE OF READ DATA TRACKING AND CACHING TO RECOVER FROM DATA CORRUPTION

(75) Inventors: Oleg Kiselev, Palo Alto, CA (US); Ronald S. Karr, Palo Alto, CA (US)

(73) Assignee: VERITAS Operating Corporation, Mountain View, CA (US)

( * ) Notice: Subject to any disclaimer, the term of this patent is extended or adjusted under 35 U.S.C. 154(b) by 0 days.

(21) Appl. No.: 11/242,216

(22) Filed: Oct. 3, 2005

Related U.S. Application Data

(63) Continuation of application No. 10/610,604, filed on Jul. 1, 2003, now Pat. No. 7,028,156.

(51) Int. Cl.
  *G06F 11/30* (2006.01)
  *G06F 17/30* (2006.01)

(52) U.S. Cl. ...................................... 711/162

(58) Field of Classification Search ..................... None
See application file for complete search history.

(56) References Cited

U.S. PATENT DOCUMENTS

| | | | |
|---|---|---|---|
| 6,910,178 B1 | 6/2005 | Kiselev et al. | 714/819 |
| 6,993,677 B1 * | 1/2006 | Wilner | 714/6 |
| 2003/0145270 A1 | 7/2003 | Holt | 714/766 |
| 2003/0167439 A1 | 9/2003 | Talagala et al. | 714/770 |

\* cited by examiner

*Primary Examiner*—Donald Sparks
*Assistant Examiner*—Jared Rutz
(74) *Attorney, Agent, or Firm*—Campbell Stephenson Ascolese LLP

(57) ABSTRACT

In a system in which read data tracking and caching is used to recover from data corruption, a first request to read data from a primary data mirror is received from a computer system. Data is read from the primary data mirror in response to receiving the first request. Additionally data from a mirrored copy of the primary data mirror is read. Data read from the primary data mirror is returned to the computer system. Data read from the mirrored copy is stored into a memory device. If a second request is received from the computer system to read the same data of the first request, data stored in the memory device may be returned in response thereto.

19 Claims, 4 Drawing Sheets

| n | Data Identification | Data Validity | Data Returned | Time Stamp | Mirror Number |
|---|---|---|---|---|---|
| 1 | block number 2 | 1 | 1 | $T_1$ | $M_1$ |
| 2 | block number 2 | 1 | 1 | $T_1$ | $M_2$ |
| 3 | block number 7 | 0 | 1 | $T_2$ | $M_1$ |
| 4 | block number 7 | 0 | 1 | $T_2$ | $M_2$ |
| 5 | block number 5 | 1 | 0 | $T_3$ | $M_1$ |
| 6 | block number 5 | 0 | 0 | $T_3$ | $M_2$ |
| 7 | block number 10 | 1 | 1 | $T_4$ | $M_1$ |
| 8 | block number 10 | 1 | 1 | $T_4$ | $M_2$ |
| 9 | block number 1 | 1 | 0 | $T_5$ | $M_1$ |
| 10 | block number 1 | 1 | 1 | $T_5$ | $M_2$ |

| n | Data Identification | Data Validity | Data Returned | Time Stamp | Mirror Number |
|---|---|---|---|---|---|
| 1 | block number 2 | 1 | 1 | $T_1$ | $M_1$ |
| 2 | block number 2 | 1 | 1 | $T_1$ | $M_2$ |
| 3 | block number 7 | 0 | 1 | $T_2$ | $M_1$ |
| 4 | block number 7 | 0 | 1 | $T_2$ | $M_2$ |
| 5 | block number 5 | 1 | 0 | $T_3$ | $M_1$ |
| 6 | block number 5 | 0 | 0 | $T_3$ | $M_2$ |
| 7 | block number 10 | 1 | 1 | $T_4$ | $M_1$ |
| 8 | block number 10 | 1 | 1 | $T_4$ | $M_2$ |
| 9 | block number 1 | 1 | 0 | $T_5$ | $M_1$ |
| 10 | block number 1 | 1 | 1 | $T_5$ | $M_2$ | ns
USE OF READ DATA TRACKING AND CACHING TO RECOVER FROM DATA CORRUPTION

CROSS-REFERENCE TO RELATED APPLICATIONS

The present patent application is a continuation of U.S. patent application Ser. No. 10/610,604, filed on Jul. 1, 2003 now U.S. Pat. No. 7,028,156, entitled "USE OF READ DATA TRACKING AND CACHING TO RECOVER FROM DATA CORRUPTION" and is incorporated by reference herein in its entirety and for all purposes.

BACKGROUND OF THE INVENTION

Many businesses employ a data processing center in which one or more memory devices (e.g., data storage disks) store their business critical data. The number of memory devices employed by businesses varies as a function of their data storage demands. As will be more fully described below, however, the frequency of data corruption incidents increases with the number of memory devices used to store data.

FIG. 1 shows a data processing center in which a computer system 10 is coupled to a host node 12. Host node 12, in turn, is coupled to data-storage systems 14–20. Each of data-storage systems 14–18 includes memory devices 24–28, respectively, for storing data. Each memory device may include several components (e.g., data storage disks).

Memory device 24 stores a primary data mirror. The primary data mirror is the working data volume for the center shown in FIG. 1. Host node 12 may take form in a computer system (e.g., a server computer system) that receives requests from client computer system 10 or other client computer systems (not shown) to read data from or write data to the primary data mirror.

Memory devices 26 and 28 store mirrored copies of the primary data mirror. The mirrors closely track changes to the primary data mirror. Thus, when host node 12 writes data to primary data mirror in response to a request from client computer system 10, the same data is written to each of mirrors in memory devices 26 and 28. As such, each mirror is maintained as a real-time copy of the primary data mirror.

The mirrors of memory devices 26 and 28 are typically provided as backup solutions in the event of failure of the memory device 24. If memory device 24 suddenly becomes unusable or inaccessible, host node 12 can service read or write requests from client computer system 10 using a mirror in memory device 26 or 28. For example, if memory device 24 becomes inaccessible due to hardware or software failure, host node 12 can respond to a request for primary data mirror data from client computer system by returning data from the mirror of memory device 26.

Failure of memory device 24 is one problem facing businesses that employ large scale data processing systems. Data corruption is another problem. Data corruption has many sources. To illustrate, suppose host node 12 receives new data $D_{new}$ from client computer system 10 coupled thereto. This new data $D_{new}$ must replace existing data $D_{old}$ within the primary data mirror. Improper operation of hardware or software may result in existing data $D_{old}$ not getting overwritten with the new data $D_{new}$. The new data $D_{new}$ may inadvertently get written to a disk track in a storage disk of memory 24 adjacent to the disk track that stores the existing data $D_{old}$ (mis-tracking). It is also possible new data $D_{new}$ may not get written to the disk at all. When this happens, two tracks of the storage disk contain invalid or corrupted data. But the host node 12 believes the existing data $D_{old}$ has been properly overwritten with the new data $D_{new}$. If host node 12 receives a subsequent request from computer system 10 to read the new data $D_{new}$ thought to be stored in the primary data mirror, $D_{old}$ will be returned rather than $D_{new}$. A different manifestation of improper operation of software or hardware may also result in new data $D_{new}$ not getting written to the disk at all, while the write completes successfully. Yet another manifestation of improper operation of software or hardware may be experienced when one or more bits in new data $D_{new}$ is corrupted in the course of data transmission and handling (hit-flipping), resulting in corrupted data getting written over one of the copies of $D_{old}$.

Redundant storage offers multiple copies of the same data into multiple data storage memories. Chances of more than a single copy of the data getting corrupted in ways described above are vanishingly small and the alternative data copies could be used to correct the corruption cases described above if they can be detected. Client computer system 10 may perform a checking algorithm on the data returned by host node 12. If computer system 10 recognizes that the data returned is invalid, the computer system sends a second request for the same data. Unfortunately, host node 12 will once again return $D_{old}$ in response to the second request.

SUMMARY OF THE INVENTION

Rather than repeatedly returning corrupted data stored in a first memory of a volume to the requesting computer system, an alternative copy of the data requested that is stored in a second memory may be returned in accordance with the present invention.

In an embodiment of the present invention, a first request to read data from the data volume is received from a computer system. Data is read from a first memory of the data volume in response to receiving the first request. Additionally data from a mirrored copy of the data stored in a second memory of the data volume is read. Data read from the first memory are returned to the computer system. Data read from the second memory is stored into a memory device. If a second request is received from the computer system to read the same data of the first request, data stored in the memory device may be returned in response thereto.

In yet another embodiment of the present invention, the two copies of data read from first and second memories are compared before any data is returned to the requesting computer system and the alternate copy of data is cached only if the data copies are not identical.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
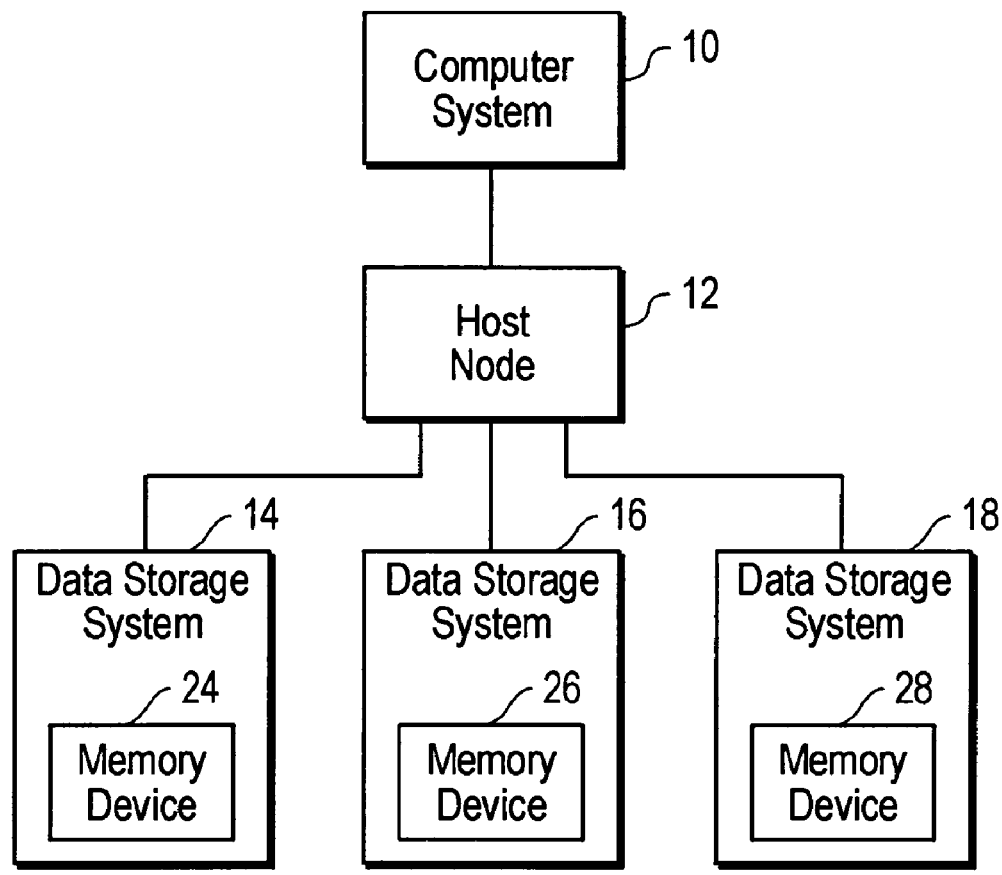
FIG. 1 is a block diagram of a prior art data storage system.
Figures 2, 3:
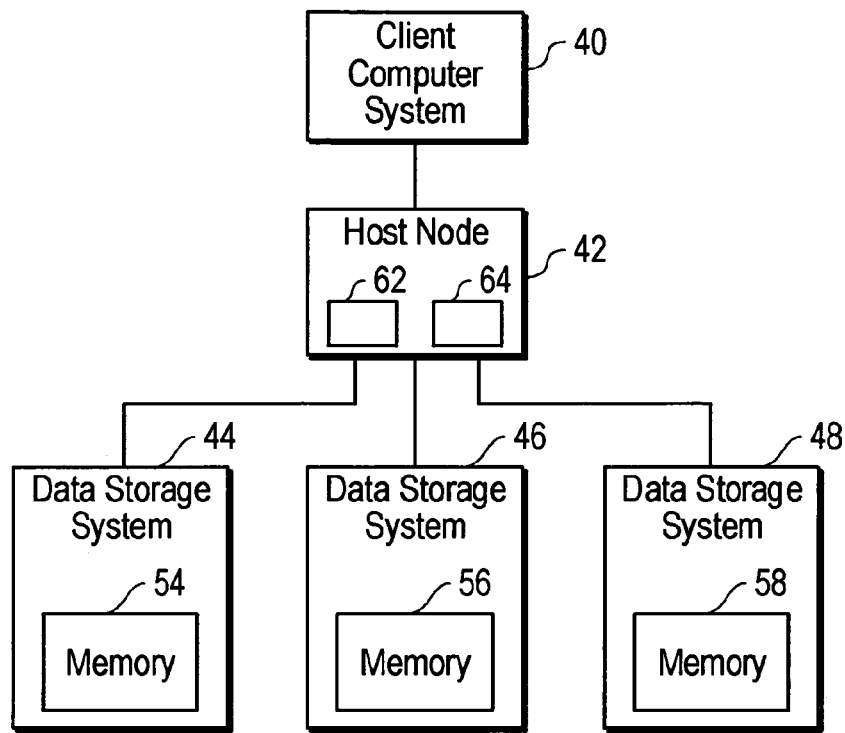
FIG. 2 is a block diagram of a data storage system employing one embodiment of the present invention.
FIG. 3 is a block diagram of a tag table employed in one embodiment of the present invention.

FIG. 2 illustrates relevant components of a data processing center employing one embodiment of the present invention. More specifically, FIG. 1 shows, in block-diagram form, a client computer system 40 coupled to a host node 42. Although not shown, additional client computer systems may be coupled to host node 42. Host node 42, in turn, is coupled to data-storage systems 44–48. Host node 42 will be described as having direct data read and write access to data stored in data-storage systems 44–48, it being understood that the present invention should not be limited thereto.

Each of data-storage systems 44–48 includes memories 54–58, respectively. Each of the memories 54–58 may take form in one or more dynamic or static random-access memories, one or more arrays of magnetic or optical data-storage disks, or combinations thereof. Memories 54–58 should not be limited to the foregoing hardware components; rather, the memories may take form in any hardware, software, or combination of hardware and software in which data may be persistently stored and accessed. Further, the memories may take form in a complex construction of several hardware components operating under the direction of software.

Each of the memories 54–58 includes $n_{max}$ physical blocks of memory into which data can be stored. It is noted that any or all of the memories 54–58 may have more than $n_{max}$ memory blocks. Corresponding memory blocks in memories 54–58 are equal in size. Thus, memory block 1 of memory 54 is equal in size to memory blocks 1 in memories 56 and 58. Each of the memory blocks within memory 54 may be equal in size to each other. Alternatively, the memory blocks in memory 54 may vary in size.

The first $n_{max}$ blocks in memory 54 store a copy of data of data volume V. The first $n_{max}$ blocks in memories 56 and 58 store mirrored copies $M_1$ and $M_2$, respectively, of the data volume V. In other words, block n of memories 56 and 58 stores a copy of the data in block n of memory 54. Data volume V can be considered a mirror, i.e., a primary data mirror $M_0$. The foregoing storage layout description should not be taken as the only way of storing data volume V. Alternatively, the copy of data may start at any offset in memories 54, 56 and 58, and each mirror may span or stripe differently across multiple data storage systems and multiple. The mirrors $M_1$ and $M_2$ are identical to and track all changes to the primary data mirror $M_0$. When host node 42 writes new data to a block n of memory 54 in response to a request received from client computer system 40, the new data is also written to block n of memories 56 and 58. As such, host node 42 seeks to maintain each of the mirrors $M_0$, $M_1$ and $M_2$ as a real-time copies of data of the data volume V. The number of mirrors need not be limited to 3, it can be as low as 2 or arbitrarily large. Because these mirrors of data are identical, any mirror may be chosen to satisfy a read request for data.

Host node 42 receives requests from client computer systems, including client computer system 40, for data of the data volume V. Data from one of the mirrors of volume V is read and returned to the client computer system. Alternatively, one of the mirrors may be chosen as the primary data copy and be used as the preferred target for reads (preferred mirror). Computer system 40 may perform a checking algorithm to determine the validity of the data returned to it from host node 42. If computer system 40 determines that the returned data is invalid, computer system 40 may generate a second request for the same data.

Mirrors $M_0$, $M_1$ and $M_2$ provide multiple sources of data to the client computer systems in the event that one or more of data storage systems 54, 56 or 58 are rendered inaccessible due to hardware and/or software failure. For example, if memory device 54 is inaccessible due to hardware or software failure, host node 42 can respond to a data request from computer system 40 and return data from mirror $M_1$ or $M_2$ stored in memory devices 56 or 58, respectively.

Host node 42 may take form in a computer system (e.g., a server computer system) having a memory (not shown) for storing instructions that, when executed by host node 42, implements an embodiment of the present invention. Host node 42 may include a data-storage management system (not shown) that takes form in software instructions executing on one or more processors (not shown). The data-storage management system includes, in one embodiment, a file system and a system for managing the distribution of data of a volume across one or more memory devices. VERITAS Volume Manager™ provided by VERITAS Software Corporation of Mountain View, Calif., is an exemplary system for managing the distribution of data of a volume across one or more memory devices.

Host node 42, in one embodiment, includes a data cache memory (hereinafter cache) 62 and memory 64 for storing a tag table 66 (FIG. 3). It is noted that host node 42 may store a separate tag table in memory 64 for each client computer system that provides host node 42 with requests to read data from the primary data mirror of memory 54. However, for purposes of explanation, it will be presumed that only tag table 66 is stored in memory 64, and that tag table 66 is associated with client computer system 40. It is further noted that cache 62 and memory 64 may be located externally to host node 42.

Cache 62 stores data entries. Assuming the preferred mirror model of mirror access, where mirror $M_0$ in memory 54 is the preferred mirror, each entry in cache 62 consists of a block or blocks of data copied from one of the alternate mirrors $M_1$ and $M_2$ in memories 56 and 58, respectively. It is noted that each entry of cache 62 may store data of a portion of a block of memories 56 and 58. However, for purposes of explanation, it will be presumed that each entry of cache 62 stores data of one or more full blocks from memories 56 and 58. Data access time for cache 62 is faster than the data access time for any of the memories 54–58. For example, the time needed for host node 42 to read data from block n in memory 56 is greater than the time needed for host node 42 to read a copy of block n data stored in cache 62.

Tag table 66 stores tags corresponding to respective data entries in cache 62. As will be more fully described below, each tag includes information relevant to its respective entry in cache 62. Host node 42 creates a new tag in table 66 each time host node 42 creates a new entry in cache 62. FIG. 3 is a block-diagram showing one embodiment of tag table 66. More particularly, FIG. 3 shows tag table 66 consisting of 10 tags corresponding to 10 data entries, respectively, in cache 62. Each tag has five fields including: a data identification field that provides an identity of the data of the corresponding entry in cache 62; a data-validity field indicating whether the data of the corresponding entry in cache 62 is valid; a data-returned field indicating whether data of the corresponding entry in cache 62 has been returned to computer system 40; a time stamp field indicating the time when the tag was created, and; a mirror number field identifying the mirror (i.e., $M_1$ or $M_2$) from which data of the corresponding entry was copied.

The data identification field stores a unique identity of the data in the corresponding cache entry. In one embodiment, the data identity may be a filename. In another embodiment, the data identity may be one or more logical block numbers. For example, an identity may be block numbers 3, 4, and 5 thus indicating that the corresponding entry in cache 62 stores data copied from blocks 3, 4 and 5 of memory 56 or 58. In yet another embodiment, the data identity may be a block number n and a quantity q of blocks beginning with block n from which data of the corresponding cache entry was copied. For example, an identity may be block 5 and quantity 4 thus indicating that the corresponding entry in cache 62 stores data copied from blocks 5, 6, 7, and 8 of memory 56 or 58. For purposes of explanation, each data identification field of FIG. 3 will be presumed to contain a logical block number, it being understood that the present invention should not be limited thereto. Host node 42 can modify the contents of each tag field.

The data-validity field, in the embodiment shown, is defined by a single bit set to logical 1 or logical 0. If this bit is set to logical 1, data of the corresponding entry of cache 62 is considered valid, and if this bit is set to logical 0, data of the corresponding entry of cache 62 is considered invalid. The data-returned field, in the embodiment shown, is defined by a single bit set to logical 1 or logical 0. If this bit is set to logical 1, data of the corresponding entry of cache 62 has not been previously returned to computer system 40 by host node 42, and if this bit is set to logical 0, data in the corresponding entry of cache 62 has been returned to computer system 40.

Figures 4, 4A:
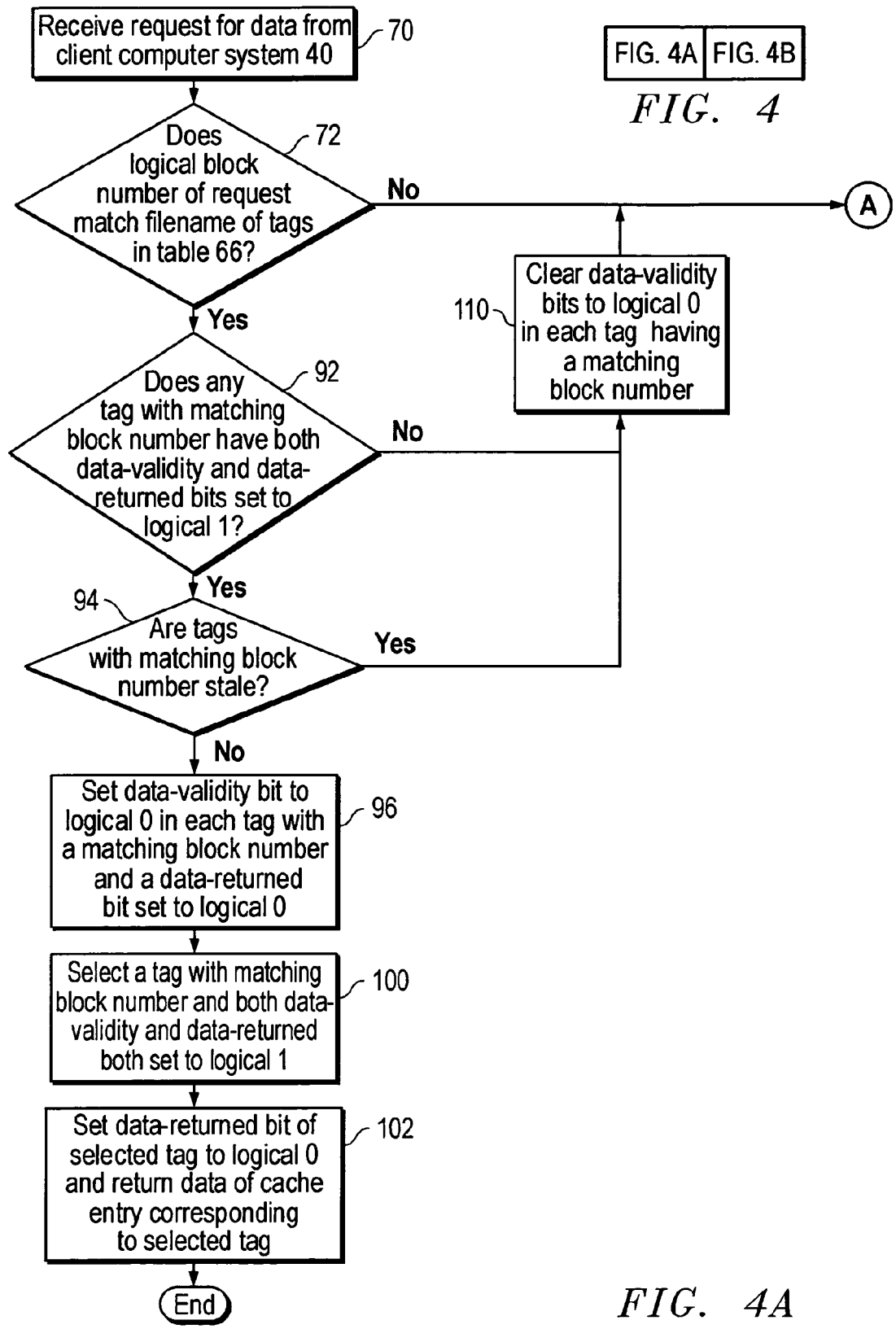
FIG. 4 is a flow chart illustrating operational aspects of responding to a request to read data in the data storage system of FIG. 2 according to one embodiment of the present invention.
Figure 4B:
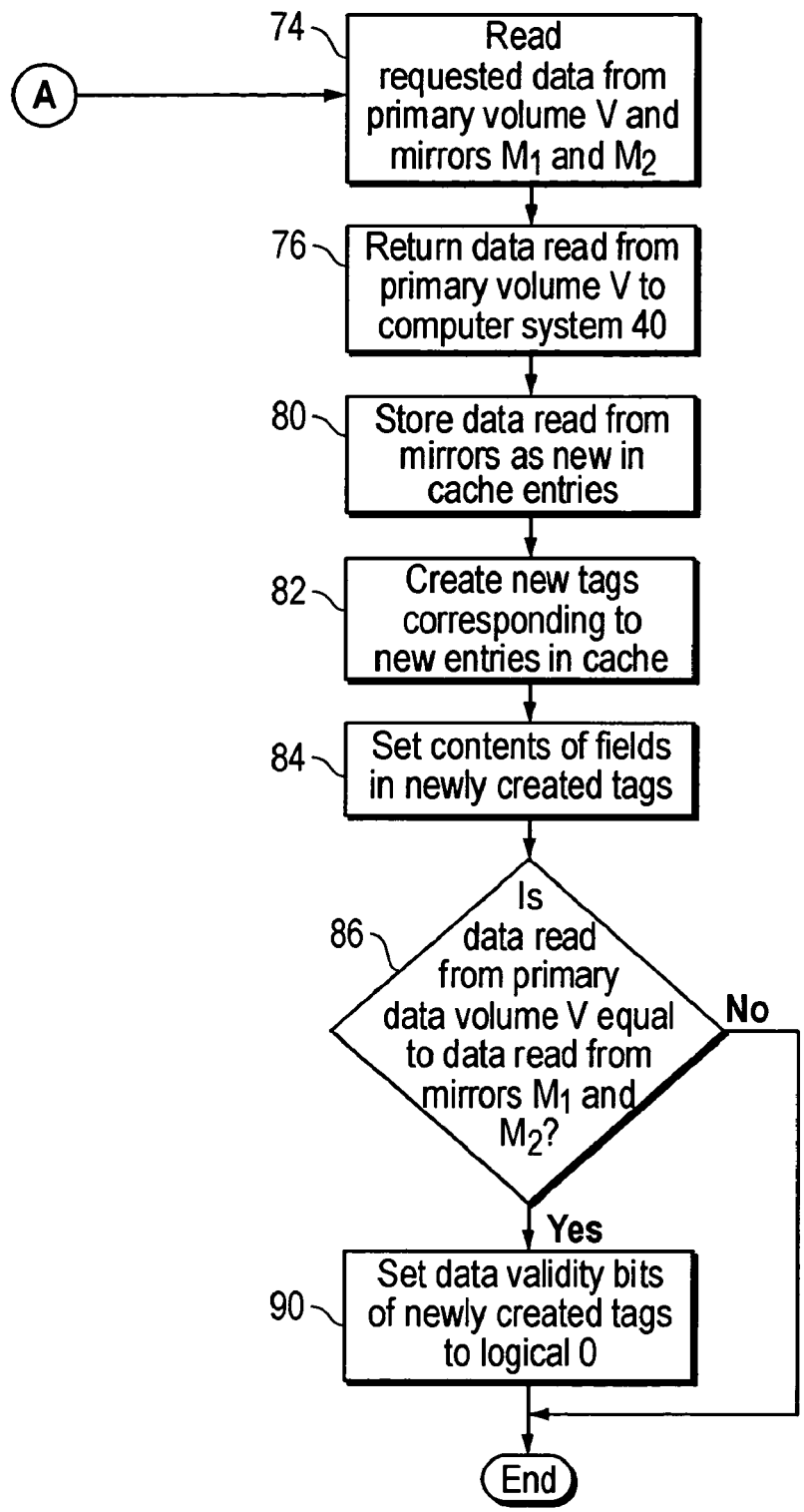

As noted, host node 42 receives requests from client computer system 40 for data of the primary data mirror stored in memory 54. In response, host node 42 will return the requested data from either the primary data mirror or from one of the mirrors $M_1$ or $M_2$ via cache 62 depending on whether the request from client computer system 40 is an initial request for the data or a second or subsequent request for the data received shortly after the initial request. If a request for data from computer system 40 is an initial request, host node 42 will return the requested data from the primary data mirror. If a request for data from computer system 40 is a second or subsequent request received shortly after the initial request, host node 42 will return the requested data from one of the mirrors $M_1$ or $M_2$ via cache 62. FIG. 4 is a flow chart illustrating relevant operational aspects performed by host node 42 in response to receiving an initial or subsequent request for data from client computer system 40 according to one embodiment of the present invention.

The process shown in FIG. 4 begins with step 70 in which host node 42 receives a request from computer system 40 to read data from the primary data mirror. This request includes an identification of the requested data. For purposes of explanation, the identification will be one or more logical block numbers associated with the requested data, it being understood that the present invention should not be limited thereto. Host node 42 accesses tag table 66 to determine whether the logical block numbers of the request matches the logical block number of any of the tags as shown in step 72. If the request received in step 70 is an initial request for the data, there will be no match between the logical block numbers in the tags and the logical block numbers of the requested data. Presuming no match in step 72, the process proceeds to step 74 where host node 42 reads the requested data from the primary data mirror. More particularly, host node 42 reads data from blocks n through n+m in memory 54 that store the requested data. It is noted that the requested data may be stored in a single block n of memory 54. Host node also reads copies of the requested data from each of the mirrors $M_1$ and $M_2$. More particularly, host node 42 reads data from blocks n through n+m in memories 56 and 58.

In step 76, host node 42 returns the data read from the primary data mirror (i.e., data from blocks ii through n+m of memory 54) to computer system 40. Host node 42 may also temporarily store this data in memory (not shown). In step 80, host node 42 stores data read from mirrors $M_1$ and $M_2$ (i.e., data from blocks n through n+m of memories 56 and 58) as separate new entries in cache 62. Computer system 40 will check the validity of the data returned to it and generate a second request for the same data if the validity check fails.

In step 82, host node creates a new tag in tag table 66 for each newly created entry in cache 62. In step 84 host node 42 sets the contents of the fields in each tag created in step 82. More particularly, host node 42 stores the logical block numbers of the requested data into each newly created tag. Host node also sets the data-validity and data-returned bits in each newly created tag. Data in the newly created cache entries are initially presumed valid. As such, host node 42 sets the data-validity bit to logical I. Because the data of the newly created cache entries have yet to be returned to computer system 40, host node 42 sets the data-returned bit to logical 1. Host node 42 stores the current time $T_c$ into the time stamp field of each newly created tag. Lastly, and optionally, host node 42 stores the mirror identity of the mirror that was the source of the respective entry in cache 62 into the mirror number field for each newly created tag. It is noted that corresponding fields of each newly created tag will be identical, initially, except for the mirror number field.

In step 86, host node 42 compares the data read from primary data mirror with data read from mirrors $M_1$ and $M_2$. In theory, the data read from primary data mirror should be identical to the data read from mirrors $M_1$ and $M_2$. However, due to data corruption, the data read from the primary data mirror may not be identical to the data read from mirrors $M_1$ and $M_2$. If the data read from the primary data mirror equals the data read from both mirrors $M_1$ and $M_2$, then in step 90, host node 42 invalidates each cache entry created in step 80, by setting the state of the data-validity field to logical 0 in each of the tags created in step 82. If, in step 86, data read from the primary mirror does not equal the data read from both mirrors $M_1$ and $M_2$, the process ends. It is noted that at any point host node 42 may modify data in the primary data mirror. Before modification, host node 42 will set the data-validity bits of any tag in table 66 that has a logical block number equal to that which stores the data to be modified.

The request received in step 70 may be a second or subsequent request for data in the primary data mirror. Computer system 40 may have generated the second or subsequent request in response to determining that data returned after a prior (e.g., a first) request is invalid. Presuming the request received in step 70 is a second or subsequent request, host node 42 in step 72 will find a match between the logical block number of the second or subsequent request and the logical block number of tags in table 66. The process then proceeds to step 92 where host node 42 determines whether any tags with matching logical block numbers also have data-validity and data-returned bits set to logical 1. Tags with data-returned bits set to logical 1 correspond to cache entries whose contents have yet to be returned to computer system 40. If host node 42 fails to find a tag that fits the criteria of step 92, the process proceeds to step 110 where host node clears the data-validity bit in each tag having a matching logical block number. Thereafter host node 42 implements steps 74 . . . 90 and creates new cache entries and corresponding tags. Host node 42 could overwrite tags in table 66 having data-validity bits set to logical 0 with the new tags generated in step 82. Additionally, host node 42 could overwrite invalidated cache entries with the new cache generated in step 80.

If host node 42 finds a tag that fits the criteria of step 92, the process proceeds to step 94 where host node 42 determines whether tags having matching logical block numbers, are stale. As noted, client computer system 40 generates a second or subsequent request for the same data requested in an earlier request when the client computer system 40 determines that previously returned data is corrupted or invalid. The second or subsequent request may include an indication that the second or subsequent request was generated in response to a determination that previously returned data was found to be corrupted or invalid. The requests received from client computer system are presumed not to include such an indication. Data of an entry in cache 32, however, should be returned to computer system 40 only when computer system 40 generates a second or subsequent request after determining the previously returned data is corrupted. To meet this condition, it will be presumed that a second or subsequent computer system 40 request for data generated a predetermined amount of time after an initial request for the same data, is not generated in response to a determination that the previously returned data was found to be corrupted. This presumption is reasonable since the second or subsequent request is generated very soon after determining the previously returned data is corrupted. Accordingly, if an entry in cache 32 is older than the predetermined amount of time, the entry is stale and should not be returned to computer system 40. Host node 42 determines whether tags are stale in step 94 by comparing the current time with the time stamp of the tags. If the time stamp is more than a predetermined amount of time earlier than the current time, the tags with the matching logical block numbers are not stale, and the process to step 96.

Tags with data-returned bit set to logical 0 correspond to cache entries whose contents have been previously returned to computer system 40. In step 96, host node 42 invalidates those entries in cache 62 whose contents were returned to computer system 40. More particularly, host node sets to logical 0 the data-validity bit of any tag with a matching logical block number and with a data-returned bit set to logical 0. Thereafter, host node in step 100 selects a tag with a matching logical block number and with data-validity and data-returned bits set to logical 1. In step 102, host node 42 sets the data-returned bit of the selected tag to logical 0, and host node 42 returns the contents of the entry in cache 62 that corresponds to the selected tag. In step 94, if host node 42 determines that the tags having matching logical block numbers are stale, then host node 42 sets the data-validity bits of the tags with matching logical block numbers to logical 0 in step 110 before proceeding to perform steps 74 . . . 90.

The process described in FIG. 4 presumes that each entry of cache 32 stores data of one of the mirrors $M_1$ or $M_2$. Alternatively, each entry of cache 62 may store the location (e.g., blocks n through n+m) of data stored in one of the mirrors $M_1$ and $M_2$ memories 56 and 58, respectively. Clearly, in the embodiment where cache 62 stores entries of data copied from memories 56 and 58, cache 62 will need to be larger than that needed to store entries of locations of data in data memories 56 and 58. The present invention can be implemented with the cache entries storing locations instead of data from one of the mirrors $M_1$ and $M_2$ if the process in FIG. 4 is slightly modified. More particularly, in step 80, locations of the data in mirrors $M_1$ and $M_2$ are stored in the cache entries rather than the data itself. Rather than return data from the cache 62 in step 102, data is returned from one of the memories 56 and 58 (depending on the mirror identity field of the selected tag) that is stored at the location defined by the cache entry that corresponds to the selected tag. Lastly, rather than overwrite data of the primary data mirror with data from the cache 62 in step 106, data of the primary data mirror is overwritten with corresponding data from stored in one of the memories 56 and 58 (depending on the mirror identity field of the selected tag) at the location defined by the cache entry that corresponds to the tag that has a matching logical block number, and data-validity and data-returned bits set to logical 1 and 0, respectively.

Although the present invention has been described in connection with several embodiments, the invention is not intended to be limited to the specific forms set forth herein. On the contrary, it is intended to cover such alternatives modifications, and equivalents as can be reasonably included within the scope of the invention as defined by the appended claims.

We claim:

1. A method comprising:
   reading data from a first memory configured to store a data volume in response to receiving a first request to read data from the data volume, wherein the first request is received from a computer system;
   reading data from a second memory configured to store a mirrored copy of the data volume in response to receiving the first request;
   comparing the data read from the first memory with the data read from the second memory;
   returning the data read from the first memory to the computer system, wherein the data read from the first memory is returned regardless of whether the data read from the first memory compares equally to the data read from the second memory;
   storing the data read from the second memory into a memory device.

2. The method of claim 1 further comprising invalidating the data stored in the memory device if the data read from the first memory compares equally to the data read from the second memory.

3. The method of claim 1 further comprising an act of reading the data stored in the memory device in response to receiving a second request to read data from the data volume, wherein the second request is received from the computer system, and wherein the first and second requests are for the same data.

4. The method of claim 3 further comprising an act of returning the data read from the memory device to the computer system if the second request is received within a predetermined amount of time after receiving the first request.

5. The method of claim 1 further comprising an act of invalidating the data stored in the memory device in response receiving a second request to read data from the data volume within a predetermined amount of time after receiving the first request, wherein the second request is received from the computer system, and wherein the first and second requests are for the same data.

6. The method of claim 1 further comprising an act of overwriting data of the data volume with the data stored in the memory device if the data read from the data volume compares unequally to the data read from the mirrored copy.

7. The method of claim 1 wherein the data of the data volume is overwritten with the data stored in the memory device unless a second request is received in a predetermined amount of time from the time the first request is received, wherein the second request is received from the computer system, and wherein the first and second requests are for the same data.

8. The method of claim 1 further comprising invalidating data stored in the memory device in response to receiving a request to modify data of the data volume, wherein the request to modify data is received from the computer system or another computer system, and wherein the data to be modified by the request to modify is the same as the data read in response to the first request.

9. A computer readable medium comprising instructions executable by a first computer system, wherein the first computer system performs a method in response to executing the instructions, the method comprising:
reading data from a first memory configured to store a data volume in response to receiving a first request to read data from the data volume, wherein the first request is received from a second computer system;
reading data from a second memory configured to store a mirrored copy of the data volume in response to receiving the first request;
comparing the data read from the first memory with the data read from the second memory;
returning the data read from the first memory to the second computer system, wherein the data read from the first memory is returned regardless of whether the data read from the first memory compares equally to the data read from the second memory;
storing the data read from the second memory into a memory device.

10. The computer readable medium of claim 9 wherein the method further comprises an act of invalidating the data stored in the memory device if the data read from the first memory compares equally to the data read from the second memory.

11. The computer readable medium of claim 9 wherein the method further comprises an act of reading the data stored in the memory device in response to receiving a second request to read data from the data volume, wherein the second request is received from the computer system, and wherein the first and second requests are for the same data.

12. The computer readable medium of claim 11 wherein the method further comprises an act of returning the data read from the memory device to the computer system if the second request is received within a predetermined amount of time after receiving the first request.

13. The computer readable medium of claim 9 wherein the method further comprises an act of invalidating the data stored in the memory device in response receiving a second request to read data from the data volume within a predetermined amount of time after receiving the first request, wherein the second request is received from the computer system, and wherein the first and second requests are for the same data.

14. The computer readable medium of claim 9 wherein the method further comprises an act of overwriting data of the data volume with the data stored in the memory device if the data read from the data volume compares unequally to the data read from the mirrored copy.

15. The computer readable medium of claim 9 wherein the data of the data volume is overwritten with the data stored in the memory device unless a second request is received in a predetermined amount of time from the time the first request is received, wherein the second request is received from the computer system, and wherein the first and second requests are for the same data.

16. The computer readable medium of claim 9 wherein the method further comprises an act invalidating data stored in the memory device in response to receiving a request to modify data of the data volume, wherein the request to modify data is received from the computer system or another computer system, and wherein the data to be modified by the request to modify is the same as the data read in response to the first request.

17. A data processing system comprising;
a first memory for storing a data volume;
a second memory for storing a mirrored copy of the data volume;
a first computer system coupled to the first and second memories, wherein the first computer system comprises a computer readable medium that stores instructions executable by the first computer system, wherein the first computer system performs a method in response to executing the instructions, the method comprising:
reading data from the first memory in response to receiving a first request to read data from the data volume, wherein the first request is received from a second computer system in data communication with the first computer system;
reading data from the second memory in response to receiving the first request;
comparing the data read from the first memory with the data read from the second memory
returning the data read from the first memory to the second computer system, wherein the data read from the first memory is returned regardless of whether the data read from the first memory compares equally to the data read from the second memory;
storing the data read from the second memory into a memory device of the first computer system.

18. The system of claim 17 wherein the method further comprises:
reading the data stored in the memory device in response to receiving a second request to read data from the data volume, wherein the second request is received from the second computer system, and wherein the first and second requests seek the same data;
returning the data read from the memory device to the second computer system.

19. A data processing system comprising;
means for receiving a first request to read data from a data volume, wherein the first request is received from a computer system;
means for reading data from a first memory for storing the data volume in response to receiving the first request;
means for reading data from a second memory for storing a mirrored copy of the data volume in response to receiving the first request;
means for returning the data read from the first memory to the computer system, regardless of whether the data read from the first memory compares equally to the data read from the second memory;
means for storing the data read from the second memory into a memory device;
means for comparing the data from the first memory with the data from the second memory.

* * * * *